UNITED STATES PATENT OFFICE.

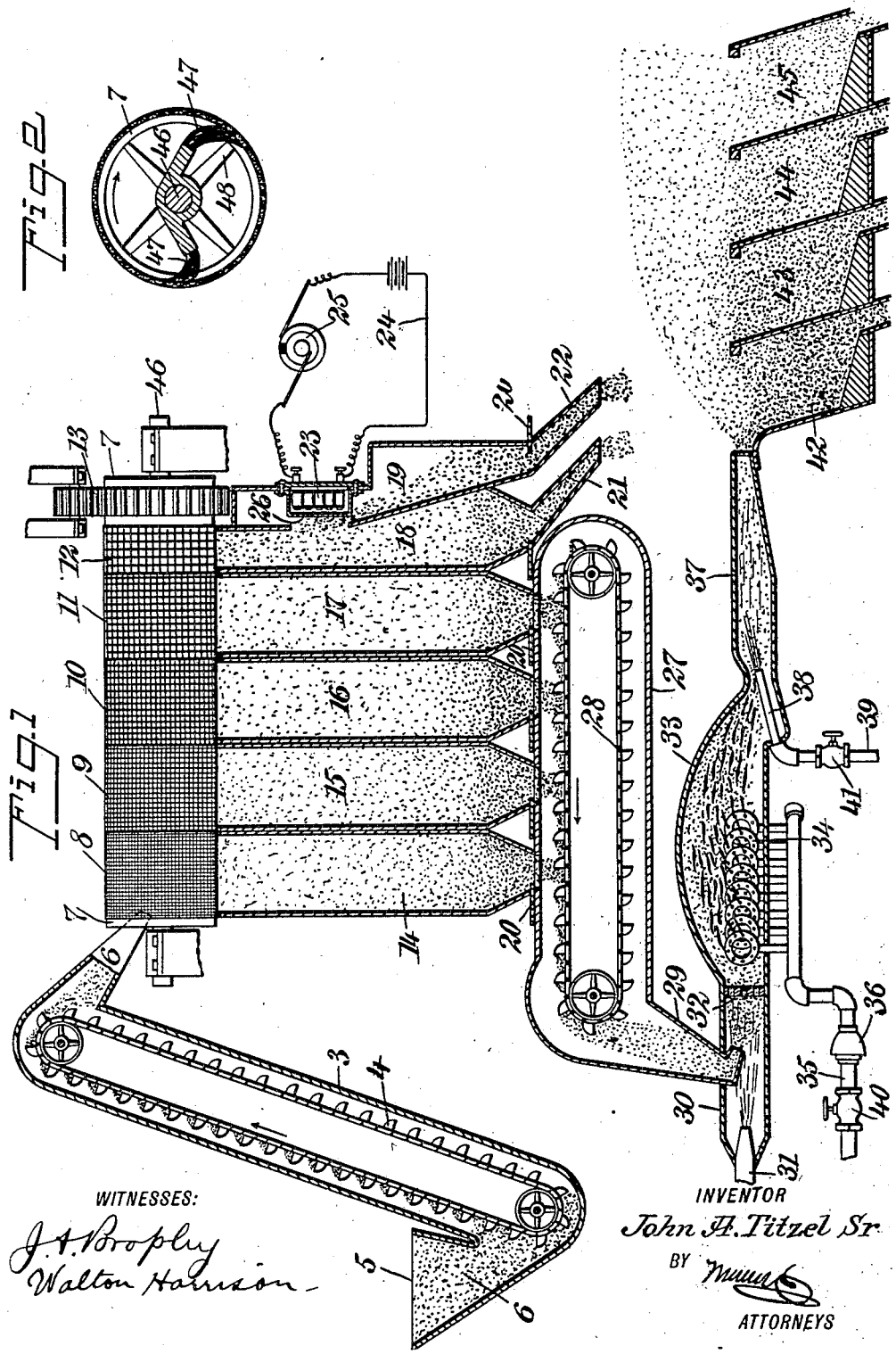

JOHN A. TITZEL, SR., OF NEWCASTLE, PENNSYLVANIA.

PROCESS OF MAKING PAINT-PIGMENTS.

No. 799,113.       Specification of Letters Patent.       Patented Sept. 12, 1905.

Application filed November 19, 1904. Serial No. 233,468.

*To all whom it may concern:*

Be it known that I, JOHN A. TITZEL, Sr., a citizen of the United States, and a resident of Newcastle, in the county of Lawrence and State of Pennsylvania, have invented a new and Improved Process of Making Paint-Pigments, of which the following is a full, clear, and exact description.

My invention relates to a process for producing a pigment or basis for making paints and preservative coatings admitting of general use, but specially applicable to surfaces of iron and steel, so as to preserve the same and especially to prevent the rusting thereof.

The pigment when prepared may be admixed with various substances and may enter to a greater or lesser extent as one of the bases used in preparing the paint. My invention therefore relates not to the manner of using the pigment after the same has been prepared, but rather to its preparation and composition.

The pigment is made from a waste product peculiar to iron and steel plants and is produced in large quantities by converter-stacks during the process of making steel. The substance settles down like snowflakes in the vicinity of the stacks or is drifted over a large area by the action of the wind. This waste product when analyzed is found to contain thirty-five to sixty per cent. of excellent graphite, ten to fifteen per cent. of silica and manganese, and fifteen to thirty per cent. of steel or iron in the form of globules ranging from the size of a navy-bean to that of a poppy-seed and even smaller, in many instances being merely a fine dust. These globules of iron or steel are found intermingled through the mass of the waste product and interspersed among the scales and flakes of the graphite. The globules are harder than a file and would ruin a stone bur-mill or embed into steel rolls should any effort be made to crush them by the use of the same. When the globules are moistened, they oxidize, and when afterward dried out they constitute a substance having the consistency of road-mud and the general appearance of a worthless rusty mass. I take this waste product and place it in a revoluble drum or so-called "rattle-barrel," together with a number of smooth hard stones, and cause the drum to revolve. This beats up the material, which is then passed through the apparatus shown in the accompanying drawings, forming a part of this specification, in which similar characters of reference indicate corresponding parts in both the figures.

Figure 1 is a sectional diagram showing the apparatus as a whole, and Fig. 2 is a vertical section through the revoluble drum.

Mounted within a chute 3 is a conveyer 4. The chute is provided with a hopper 5 and with a spout 6. A revoluble drum 7 is provided with sieves 8, 9, 10, 11, and 12, of thin metal, for the purpose of separating the material into grades of different fineness. Gearing 13 is used for rotating the drum. A number of bins 14, 15, 16, 17, 18, and 19 are each provided with a sliding door 20, whereby the contents of the bin may be discharged below. The bins 18 and 19 are provided with spouts 21 22 and are fed by the sieve 12, which discharges the coarse material passing through the drum. A number of electromagnets 23 are energized by an electric circuit 24, provided with an interrupter 25, which periodically makes and breaks the current, thereby energizing and deënergizing the magnets 23. While the magnets are energized they attract the magnetic particles of the material discharged from the sieve or screen 12, and this material therefore passes into the bin 19 each time the circuit is broken. A wall 26, of non-magnetic material, separates the magnets 23 from the material discharged from the screen 12, and the non-magnetic particles attracted by the magnets tend to cluster against this wall during the time while the magnets 23 are energized. As often, however, as the magnets are deënergized the magnetic material thus clustered drops into the bin 19. Below the bins 14, 15, 16, and 17 is a chute 27, in which is a conveyer 28. This chute 27 is provided with a spout 29, leading downwardly therefrom and communicating with a blast-compartment 30. An air-blast 31 opens into this compartment. A partition 32 obstructs the forward end of this compartment and separates it from an oven 33. Mounted within this oven are a number of gas-burners 34, fed by natural gas from a pipe 35, which is provided with an air-mixer 36, these parts being of ordinary construction. The oven 33 is provided with a large nozzle 37, into which passes a comparatively small nozzle 38, connected with a steam-pipe 39. The pipes 35 and 39 are controllable at will by means of hand-valves 40 and 41. A number of receptacles 42 43 44 45, &c., are provided in front of the nozzle 37, so as to catch the material discharged therefrom.

The drum 7 is mounted upon a stationary shaft 46, which is provided with stationary brushes 47, adapted to engage the inner surface of the screens as the drum revolves. This drum is provided with spiders 48, whereby it is rotated upon the stationary shaft 46.

The material having been beaten up or comminuted, as above described, is placed in the hopper 5, and the mechanism is started into action. The conveyer 4 carries the material upward and discharges it through the spout 6 into the revoluble drum 7. The material is thus separated into a number of grades represented by the compartments or bins 14, 15, 16, or 17. One or more of these bins being opened at the bottom by means of the doors 20, the material passes into the chute 27 and is carried by the conveyer 28 over to the spout 29 and discharged into the receptacle 30. The exceedingly coarse material dropping into the bin 18 may be further beaten and used over again or may be employed for some other purposes. The magnetic material separated at the sieve 9 may also be subjected to further action and may be beaten up and used in the next charge, if desired. The air-blast 31 being in action, the air-jet carries the finely-divided material through the perforated screen 32 and into the oven. The burners 34 are fed by natural gas from the pipe 35, which is in turn fed with a limited supply of air by means of the air-mixer 36, heating the material while the same is in motion to a comparatively high temperature ranging from a red to a white heat. Superheated steam being now admitted through the pipe 39 and small nozzle 38 to the large nozzle 37 catches the red-hot material and drives it forward through the nozzle 37. The motion of the red-hot particles, accelerated as it is by the velocity of the superheated steam, carries the particles a comparatively great distance from the nozzle 37 and causes them to drop into the various compartments 42 43 44 45, according to their degree of fineness, the smallest particles going into the farthest compartment and the larger particles dropping close at hand.

An analysis of the material taken from the compartments 42, 43, 44, and 45 shows it to be a homogeneous substance having peculiar properties which make it useful as a pigment. It may be employed somewhat after the manner of white lead. The graphite contained in it remains unchanged, whereas the iron has the form of its various high oxids, such as ferric oxid, black or magnetic oxid, and ferroso-ferric oxid, or the substance sometimes designated "bouer barff." If desired, the material taken from the receptacles 42, 43, 44, and 45 may be subjected to still further comminution, but this is hardly necessary. The product thus formed is noted for its inertness and for the readiness with which it admixes with the various ingredients commonly used for preparing paints, varnishes, and the like. Owing to the fact that the material has passed in the first instance through the converter-stack of the iron plant and has been successively subjected to the action of heating by means of natural gas and then to the oxidizing action of superheated steam in contact with air, it is out of the question that the materials under ordinary atmospheric conditions undergo further chemical change. The result therefore is that the substance formed, when incorporated into a paint, is about as stable as any substance can be made. The silica and manganese appear to be unchanged. The product therefore consists, approximately, of thirty-five to sixty per cent. of graphite, ten to fifteen per cent. of silica and manganese, and fifteen to thirty per cent. of the various oxids of iron.

I preferably employ the admixture of air and gas so as to attain a pressure of about eight ounces per square inch, and thus to produce a blue flame. The air from the nozzle 31 is liberated from a normal pressure of one or two ounces per square inch. The steam-pressure employed in connection with the nozzle 38 is preferably two hundred pounds per square inch and is supplied from a high drum or else is superheated.

In some instances I prefer to take the material from the converter of a blast-furnace, and while this material is very hot blow it directly into a receptacle and direct a steam-jet upon it. The material thus treated is now removed and screened, so as to free it of particles of non-oxidized iron and other impurities.

Having thus described my invention, I claim as new and desire to secure by Letters Patent—

1. The process herein described of preparing a pigment from the waste material thrown out of converter-stacks and the like, which consists in heating said material to a comparatively high temperature, and subjecting the material thus heated to the action of superheated steam.

2. The process herein described of preparing a pigment from the waste material thrown out of converter-stacks and the like, which consists in comminuting the material, separating the same to various degrees of fineness, and subjecting the material to the action of a natural-gas flame and of superheated steam.

3. The process herein described of preparing a pigment from the waste material thrown out of converter-stacks and the like, which consists in comminuting the material, subjecting the same to the action of air and of a natural-gas flame fed by air, then subjecting said material to the action of superheated steam, and finally separating the finished material into different degrees of fineness.

4. The process herein described of preparing a pigment from the waste material thrown out of converter-stacks and the like, which consists in comminuting the material, heating the same by an oxidizing-flame, and subjecting the material thus heated to the action of superheated steam for the purpose of causing complete oxidation.

In testimony whereof I have signed my name to this specification in the presence of two subscribing witnesses.

JOHN A. TITZEL, Sr.

Witnesses:
 Geo. W. Miller,
 L. O. Johnston.